US012506247B2

(12) United States Patent
Jang et al.

(10) Patent No.: US 12,506,247 B2
(45) Date of Patent: Dec. 23, 2025

(54) ELECTRONIC DEVICE COMPRISING CONDUCTIVE HOUSING AND ANTENNA

(71) Applicant: Samsung Electronics Co., Ltd., Gyeonggi-do (KR)

(72) Inventors: Sooyoung Jang, Gyeonggi-do (KR); Seho Kim, Gyeonggi-do (KR); Ilseub Kim, Gyeonggi-do (KR); Gyubok Park, Gyeonggi-do (KR); Dongryul Shin, Gyeonggi-do (KR); Yonghee An, Gyeonggi-do (KR); Bomi Lee, Gyeonggi-do (KR); Injin Hwang, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 272 days.

(21) Appl. No.: 18/096,111

(22) Filed: Jan. 12, 2023

(65) Prior Publication Data

US 2023/0146643 A1 May 11, 2023

Related U.S. Application Data

(63) Continuation of application No. PCT/KR2021/010103, filed on Aug. 3, 2021.

(30) Foreign Application Priority Data

Aug. 4, 2020 (KR) ........................ 10-2020-0097660

(51) Int. Cl.
*H01Q 1/22* (2006.01)
*H01Q 1/48* (2006.01)
*H01Q 9/04* (2006.01)

(52) U.S. Cl.
CPC ................. *H01Q 1/22* (2013.01); *H01Q 1/48* (2013.01); *H01Q 9/045* (2013.01)

(58) Field of Classification Search
CPC ............ H01Q 1/22; H01Q 1/48; H01Q 9/045; H01Q 1/243
See application file for complete search history.

(56) References Cited

U.S. PATENT DOCUMENTS 8,842,048 B2 9/2014 Kim et al.
9,059,506 B2 6/2015 Kim et al.
(Continued)

FOREIGN PATENT DOCUMENTS

KR 10-2013-0110323 A 10/2013
KR 10-2015-0064566 6/2015
(Continued)

OTHER PUBLICATIONS

Korean Office Action dated Jul. 18, 2024.
International Search Report dated Nov. 25, 2021.

*Primary Examiner* — Dieu Hien T Duong
(74) *Attorney, Agent, or Firm* — Cha & Reiter, LLC

(57) ABSTRACT

Disclosed is an electronic device including a display; a rear plate including a conductive material; a side member including a conductive material and disposed to surround a space between the display and the rear plate; a printed circuit board disposed between the display and the rear plate; an antenna pattern at least partially disposed between the printed circuit board and the rear plate and at a position corresponding to a slit between the rear plate and the side member; and a communication module which generates a communication signal transmitted to a power feeding unit. A portion of the antenna pattern may be electrically connected to the power feeding unit. Another portion of the antenna pattern may be electrically connected to a ground region of the printed circuit board. The power feeding unit may be connected to a portion of the side member. Various other embodiments are possible.

13 Claims, 13 Drawing Sheets

(56) References Cited

U.S. PATENT DOCUMENTS

| | | | |
|---|---|---|---|
| 9,385,418 B2 | 7/2016 | Kim et al. | |
| 9,666,934 B2 | 5/2017 | Lombardi et al. | |
| 9,680,206 B2 | 6/2017 | Youn et al. | |
| 9,768,492 B2 | 9/2017 | Kim et al. | |
| 9,819,383 B2 | 11/2017 | Youn et al. | |
| 9,882,284 B2 | 1/2018 | Eom et al. | |
| 9,985,679 B2 | 5/2018 | Youn et al. | |
| 10,367,250 B2 | 7/2019 | Chen et al. | |
| 10,567,025 B2 | 2/2020 | Youn et al. | |
| 10,608,324 B2 | 3/2020 | Lee et al. | |
| 10,819,011 B2 | 10/2020 | Lee et al. | |
| 10,971,809 B2 | 4/2021 | Shin et al. | |
| 11,011,850 B2 | 5/2021 | Wu et al. | |
| 11,217,875 B2 | 1/2022 | Kim et al. | |
| 2012/0262345 A1 | 10/2012 | Kim et al. | |
| 2013/0257662 A1 | 10/2013 | Eom et al. | |
| 2016/0254588 A1* | 9/2016 | Kim | H01Q 1/24 343/702 |
| 2016/0301139 A1 | 10/2016 | Lombardi et al. | |
| 2016/0344090 A1 | 11/2016 | Chiang et al. | |
| 2017/0117616 A1 | 4/2017 | Chen et al. | |
| 2018/0090821 A1 | 3/2018 | Lee et al. | |
| 2019/0027808 A1* | 1/2019 | Mow | H04R 5/04 |
| 2019/0207319 A1 | 7/2019 | Wu et al. | |
| 2020/0067177 A1 | 2/2020 | Wang et al. | |
| 2021/0273341 A1 | 9/2021 | Wu et al. | |

FOREIGN PATENT DOCUMENTS

| | | |
|---|---|---|
| KR | 10-2016-0043752 | 4/2016 |
| KR | 10-2016-0120668 | 10/2016 |
| KR | 10-2018-0035605 | 4/2018 |
| KR | 10-2018-0108147 | 10/2018 |
| KR | 10-2018-0130412 | 12/2018 |
| KR | 10-2019-0112519 | 10/2019 |
| KR | 10-2020-0036460 | 4/2020 |
| KR | 10-2020-0046246 | 5/2020 |

* cited by examiner

ELECTRONIC DEVICE COMPRISING CONDUCTIVE HOUSING AND ANTENNA

CROSS-REFERENCE TO RELATED APPLICATION(S)

This application is a continuation of International Application No. PCT/KR2021/010103, which was filed on Aug. 3, 2021, and claims priority to Korean Patent Application No. 10-2020-0097660, filed on Aug. 4, 2020, in the Korean Intellectual Property Office, the disclosure of which are incorporated by reference herein their entirety.

BACKGROUND

Technical Field

One or more embodiments of the instant disclosure generally relate to technology for implementing an antenna in an electronic device that includes a conductive housing.

Description of Related Art

As mobile communication technologies have developed, electronic devices that are equipped with antennas are being widely commercially available. One such electronic device may transmit and/or receive radio frequency (RF) signals including voice signals or data (e.g., message, photo, video, music file, or games) by using its antenna. But at the same time, the electronic device may have a metallic housing that provides mechanical rigidity and other design benefits. In the electronic device, a portion of metallic side surface of the housing may be utilized as an antenna.

SUMMARY

An electronic device may include a housing implemented with a rear cover and a side member. The rear cover and the side member may each include a conductive member. The performance of the antenna included in the electronic device may be reduced due to the rear cover or the side member, because the conductive member may serve as a shield. Similarly, a metal layer included in the display of the electronic device may also reduce antenna performance.

According to an embodiment of the disclosure, an electronic device may include a display, a rear plate including a conductive material, a side member including a conductive material and disposed to surround a space between the display and the rear plate, a printed circuit board disposed between the display and the rear plate, an antenna pattern at least partially disposed between the printed circuit board and the rear plate and disposed at a location corresponding to a slit between the rear plate and the side member, and a communication module generating a communication signal transferred to a feeding part. A portion of the antenna pattern may be electrically connected with the feeding part. Another portion of the antenna pattern may be electrically connected with a ground region of the printed circuit board. The feeding part may be connected with a portion of the side member.

According to an embodiment of the disclosure, an electronic device may include a display, a rear plate including a conductive material, a side member including a plurality of portions made of a conductive material and disposed to surround a space between the display and the rear plate, a printed circuit board disposed between the display and the rear plate, an antenna pattern at least partially disposed between the printed circuit board and the rear plate and disposed at a location corresponding to a slit between the rear plate and the side member, and a communication module generating a communication signal transferred to a feeding part. A portion of the side member may be connected with the feeding part to support communication for a first frequency band. The antenna pattern may be connected with the feeding part to support communication for a second frequency band.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components will be marked by the same or similar reference signs.

DETAILED DESCRIPTION

One or more embodiments of the instant disclosure are generally directed to an electronic device with improved antenna performance. This may be done by disposing an antenna pattern at a location corresponding to a slit between the rear surface and the side surface of the housing of the electronic device, where both the rear surface and the side surface including a conductive member.

In addition, various other advantages or aspects of the disclosed embodiments directly or indirectly understood through this disclosure may be provided.

Hereinafter, certain embodiments of the disclosure may be described with reference to accompanying drawings. However, those of ordinary skill in the art will recognize that modification, equivalent, and/or alternative on various embodiments described herein can be variously made without departing from the scope and spirit of the disclosure.

Figure 1:
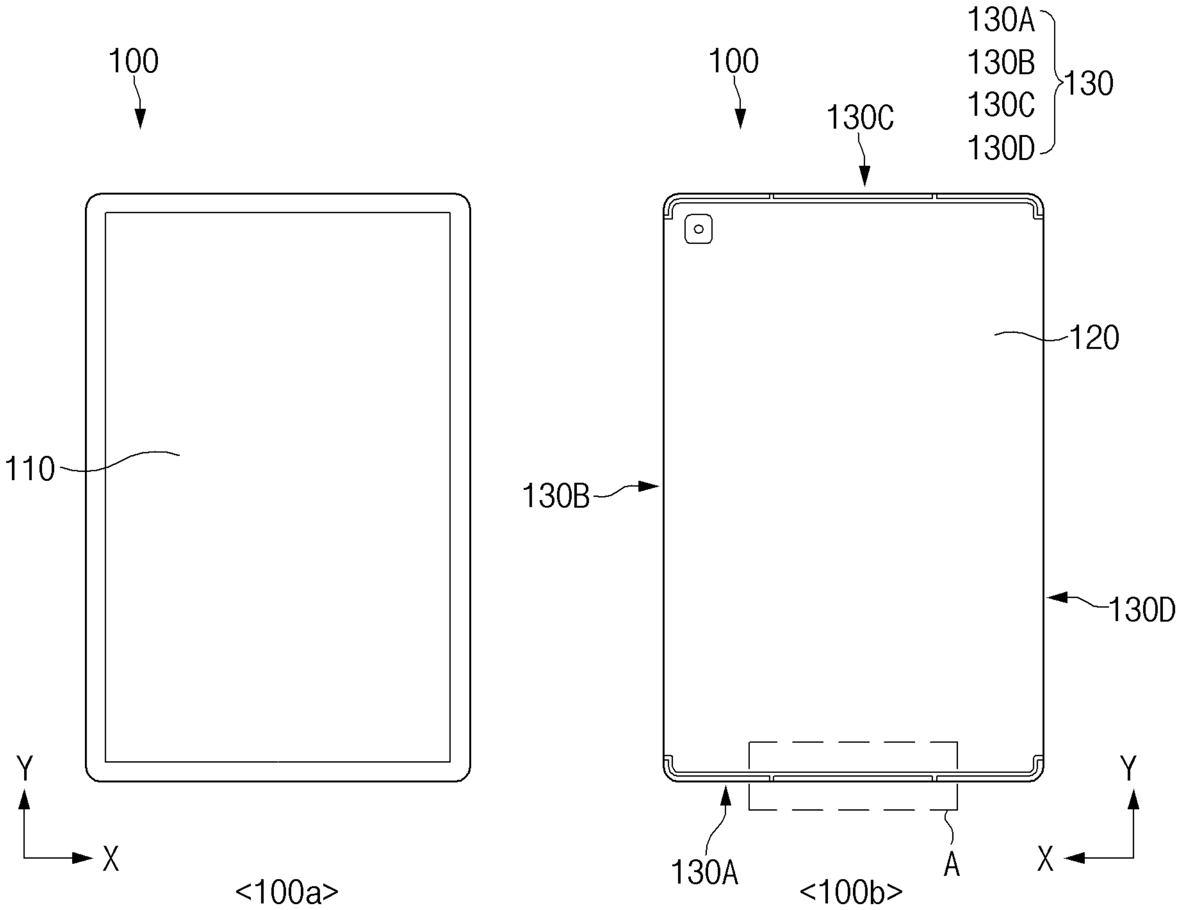
FIG. 1 is a view illustrating an example of the exterior of an electronic device according to an embodiment.

FIG. 1 is a view illustrating an example of the exterior of an electronic device according to an embodiment.

Referring to FIG. 1, reference numeral 100*a* may indicate the front surface of an electronic device 100. Reference numeral 100*b* may indicate the rear surface of the electronic device 100. In an embodiment, the electronic device 100 may include a display 110, a rear plate 120, and a side member 130. In an embodiment, the side member 130 may include a first side member 130A disposed on a lower end portion (e.g., in the −Y-axis direction) of the electronic device 100, a second side member 130B disposed on one side (e.g., in the +X-axis direction) of the electronic device 100, a third side member 130C disposed on an upper end portion (e.g., in the +Y-axis direction) of the electronic device 100, and a fourth side member 130D disposed on an opposite side (e.g., in the −X-axis direction) of the electronic device 100. As an example, the rear plate 120 and the side member 130 may be integrally formed. As another example, the rear plate 120 and the side member 130 may be independently formed and may then be coupled. In an embodiment, a portion (e.g., the first side member 130A and the third side member 130C) the side member 130 may be disposed to be physically or electrically separated from the rear plate 120. In an embodiment, another portion (e.g., the second side member 130B and the fourth side member 130D) of the side member 130 may be integrally formed. In an embodiment, the rear plate 120 and the side member 130 may be made of a conductive material (e.g., aluminum, stainless steel (STS), or magnesium).

According to an embodiment, the display 110 may include a conductive sheet (not illustrated). According to an embodiment, the conductive sheet may be metallic (e.g., a metal plate) and may help reinforce the rigidity of the electronic device 100, may shield ambient noise, and may be used to distribute heat from an internal component of the electronic device emitting heat. According to an embodiment, the conductive sheet may be made with Cu, Al, Mg, SUS, or CLAD (e.g., a stacked member in which the SUS and the Al are alternately disposed).

According to an embodiment, a first slit (e.g., first slit 231 of FIG. 2A to be described later) may be formed between the rear plate 120 and the first side member 130A. For example, the first side member 130A may be divided into a plurality of portions and may include at least one slit (e.g., second slit 232 or third slit 233 of FIG. 2A to be described later). In an embodiment, the first side member 130A may be divided into the plurality of portions, by the at least one slit. In an embodiment, the first slit or the at least one slit (e.g., the first slit 231, the second slit 232, or the third slit 233 to be described later) may be at least partially filled with a dielectric material (e.g., non-conductive resin). In an embodiment, at least a portion of the first side member 130A may be included in an antenna (e.g. may be used as an antenna radiator).

According to an embodiment, a second slit (e.g., the first slit 231 of FIG. 2A to be described later) may be formed between the rear plate 120 and the third side member 130C. For example, the third side member 130C may be divided into a plurality of portions and may include at least one slit (e.g., the second slit 232 or the third slit 233 of FIG. 2A to be described later). In an embodiment, the third side member 130C may be divided into the plurality of portions, by the at least one slit. In an embodiment, the second slit or the at least one slit (e.g., the first slit 231, the second slit 232, or the third slit 233 to be described later) may be at least partially filled with a dielectric material filled). In an embodiment, at least a portion of the third side member 130C may be included in the antenna (e.g. may be used as an antenna radiator).

Figure 2A:
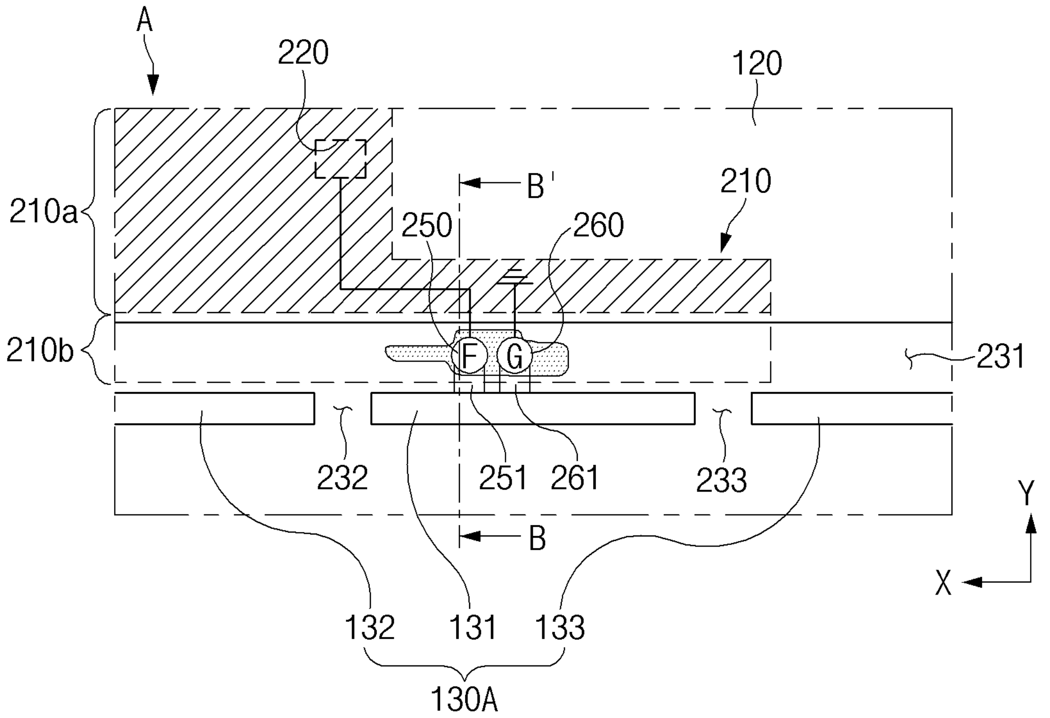
FIG. 2A is a view illustrating an antenna pattern disposed at portion A of FIG. 1.
Figure 2B:
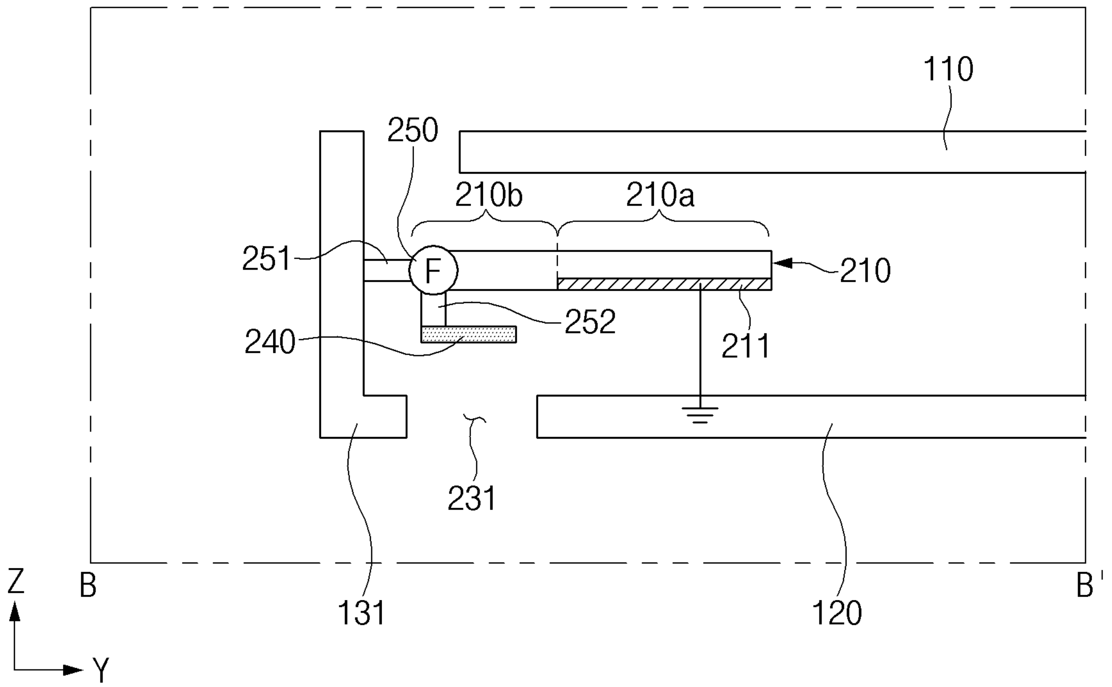
FIG. 2B is a view illustrating a cross section taken along line B-B' of FIG. 2A

FIG. 2A is a view illustrating an antenna pattern disposed at portion A of FIG. 1. FIG. 2B is a view illustrating a cross section taken along line B-B' of FIG. 2A Referring to FIGS. 2A and 2B, an electronic device (e.g., the electronic device 100 of FIG. 1) according to an embodiment may include a printed circuit board 210. In an embodiment, the printed circuit board 210 may be disposed between the display 110 and the rear plate 120. For example, a processor, a memory, and/or an interface may be disposed on the printed circuit board 210. The processor may include, for example, one or more of a central processing unit, an application processor, a graphic processing device, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may be used to electrically or physically connect, for example, the electronic device 100 with an external electronic device and may include a USB connector, an SD card/MMC connector, or an audio connector. For ease of description and to properly show the PCB 210, the rear plate 120 is removed in FIG. 2A. In FIG. 2A, the first area 210*a* of the PCB 210 is indicated by a hatched pattern.

Figure 8:
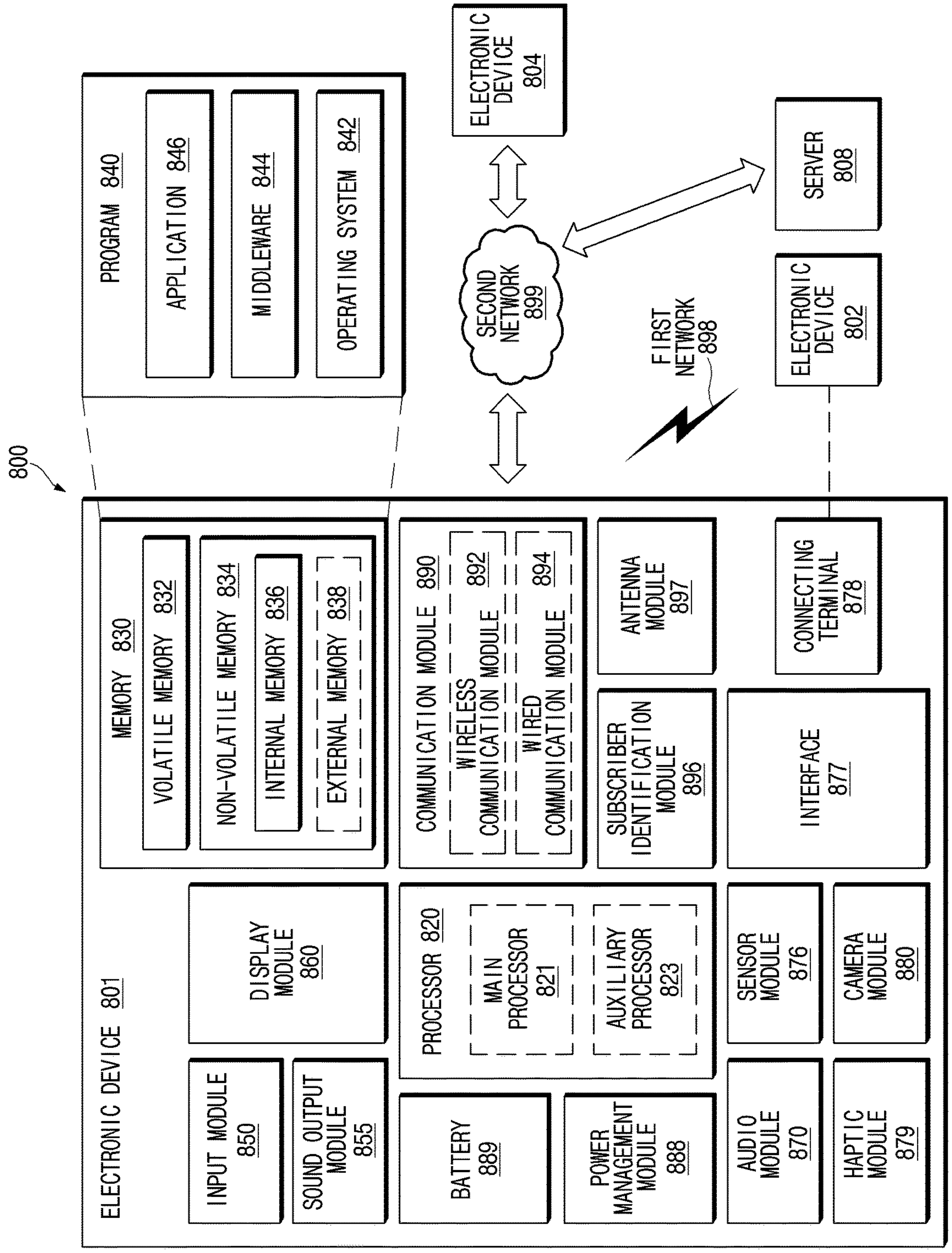
FIG. 8 is a block diagram of an electronic device in a network environment, according to an embodiment.

The electronic device 100 according to an embodiment may include a communication module 220 (e.g., communication module 890 of FIG. 8). According to an embodiment, the communication module 220 may be disposed on the printed circuit board 210. For example, the communication module 220 may establish a direct (e.g., wired) communication channel or a wireless communication channel between the electronic device 100 and the external electronic device and may support communication execution through the established communication channel. In an embodiment, the communication module 220 may operate independently of the processor (e.g., an application processor), but the disclosure is not limited thereto. In an embodiment, the communication module 220 may include one or more communication processors that support the direct (e.g., wired) communication or the wireless communication. The communication module 220 may be connected with at least one antenna to transmit signal or power to the outside (e.g., to an external electronic device) or to receive signal or power from the outside. The communication module 220 may be electrically connected with at least one feeding part (e.g., feeding part 250).

According to an embodiment, the first slit 231 may be disposed between the rear plate 120 and the first side member 130A. In an embodiment, the first slit 231 may be disposed (or formed) between the rear plate 120 and the first side member 130A. For example, the first slit 231 may be formed as the rear plate 120 and the first side member 130A are at least partially spaced apart from each other. In an embodiment, the first slit 231 may be at least partially extended along the first side member 130A. For example, the first side member 130A may include a portion (e.g., first portion 131) extended in a first direction (e.g., the X-axis direction), and the first slit 231 may include a portion extended in the same direction as the first direction. In this example, the first slit 231 may be extended to be parallel to the first side member 130A. For example, when viewed from above the rear plate 120 or the printed circuit board 210, the first slit 231 may be extended along the longitudinal direction in which a second portion 132 of the first side member 130A, the second slit 232, the first portion 131, the third slit 233, and a third portion 133 are extended.

In an embodiment, the first side member 130A may include the first portion 131, the second portion 132, and/or the third portion 133. In an embodiment, the first portion 131, the second portion 132, and the third portion 133 may be at least partially made of a conductive material (e.g., conductive metal). In an embodiment, the first portion 131 and the second portion 132 may be at least partially spaced apart from each other. In an embodiment, the second slit 232 may be disposed (or formed) between the first portion 131 and the second portion 132. In an embodiment, the first portion 131 and the third portion 133 may be at least partially spaced apart from each other. In an embodiment, the third slit 233 may be disposed (or formed) between the first portion 131 and the third portion 133. In an embodiment, the first portion 131, the second portion 132, and/or the third portion 133 may be at least partially filled with a dielectric material.

In an embodiment, it may be understood that, since the first portion 131, the second portion 132, and the third portion 133 are at least partially made of a conductive material, the side member 130 (e.g. the first side member 130A) includes a conductive portion and the conductive portion includes the first portion 131, the second portion 132, and the third portion 133.

According to an embodiment, at least a portion (e.g., the first portion 131) of the first side member 130A may be included in the antenna. For example, the first portion 131 may be electrically connected with the feeding part 250 through a first connection member 251 (e.g., a side contact) at a first location (or first point). The first portion 131 may be electrically connected with a ground part 260 through a second connection member 261 (e.g., a side contact) at a second location (or second point) spaced apart from the first location. In an embodiment, the first connection member 251 and/or the second connection member 261 may each include a C-clip connector, but the disclosure is not limited thereto. The feeding part 250 may be connected with the communication module 220. The printed circuit board 210 may include a first region 210*a* and/or a second region 210*b*. In an embodiment, the first region 210*a* may at least partially overlap the rear plate 120, when viewed from above the printed circuit board 210 or the rear plate 120. In an embodiment, the second region 210*b* may at least partially overlap the first slit 231, when viewed from above the printed circuit board 210 or the rear plate 120. In an embodiment, the first region 210*a* may include a ground region 211. In an embodiment, the ground region 211 of the first region 210*a* may include, for example, a region, a surface, or a layer made of a conductive material (e.g., copper). A fill-cut process may be performed on the second region 210*b*. The second region 210*b* may not include a conductive layer (e.g., the ground region 211). As another example, the printed circuit board 210 may not include the second region 210*b*. In an embodiment, the ground part 260 may be electrically connected with the ground region 211 of the printed circuit board 210. In an embodiment, the ground region 211 may be electrically connected with the rear plate 120.

In an embodiment, the electronic device 100 may include an antenna pattern 240. According to an embodiment, the antenna pattern 240 may be disposed to at least partially overlap the first slit 231, when viewed from above the rear surface of the electronic device 100 (or when viewed in the Z-axis direction). In an embodiment, the antenna pattern 240 may be included in the antenna. For example, the antenna pattern 240 may be electrically connected with the feeding part 250 through a third connection member 252 (e.g., a C-clip) at a third location (or third point). In an embodiment, the antenna pattern 240 may be electrically connected with the ground part 260 through a fourth connection member (not illustrated) (e.g., a C-clip) at a fourth location (or fourth point) spaced apart from the third location. As an example, the antenna pattern 240 may be implemented with a flexible printed circuit board (FPCB) or laser direct structuring (LDS). In this example, the antenna pattern 240 may be implemented in such a way that a conductive pattern is formed in at least one layer of the FPCB. The conductive pattern may include a conductive material, for example, copper (but, the disclosure is not limited thereto). When the antenna pattern 240 is implemented with an FPCB, the electronic device 100 according to an embodiment may include the FPCB. In this case, it may be understood that the antenna pattern 240 may be formed in the FPCB. According to an embodiment, the first portion 131 and the antenna pattern 240 may be included in the antenna. The antenna may transmit and/or receive signals in a first frequency band and/or signals in a second frequency band. For example, the first frequency band or the second frequency band may be substantially identical to or different from each other. According to an embodiment, the first portion 131 may be connected with the feeding part 250 to support communication for the first frequency band. The antenna pattern 240 may be connected with the feeding part 250 to support communication for the second frequency band. In an embodiment, the communication module 220 may feed the first portion 131 and/or the antenna pattern 240 through the feeding part 250 and may transmit and/or receive wireless signals in the first frequency band and/or the second frequency band. For example, the communication module 220 may feed the first portion 131 and the antenna pattern 240 and may transmit/receive wireless signals in the first frequency band and the second frequency band different from the first frequency band. For example, the first frequency band may include a frequency lower than the second frequency band (but, the disclosure is not limited thereto). For example, at least a portion of the conductive portion of the first side member 130A including the first portion 131 may implement a first resonant frequency corresponding to the first frequency band, and the antenna pattern 240 may implement a second resonant frequency corresponding to the second frequency band.

According to an embodiment, the antenna pattern 240 may be adjacent to the display 110, may be adjacent to the rear plate 120, and may be located to be equidistant to the display 110 and the rear plate 120 in the Z axis direction. For example, the antenna pattern 240 may be located to be closer to the display 110 than to the rear plate 120 in the Z axis direction of FIG. 2B. In another example, the antenna pattern 240 may be located to be closer to the rear plate 120 than to the display 110 in the Z axis direction of FIG. 2B. In yet another example, the antenna pattern 240 may be located to be substantially equidistant from the display 110 and the rear plate 120 in the Z axis direction of FIG. 2B.

In an embodiment, the antenna pattern 240 may at least partially overlap the display 110. For example, the antenna pattern 240 may at least partially overlap the display 110, when viewed from above the printed circuit board 210 or the rear plate 120 (or when viewed in the Z-axis direction of FIG. 2B). For example, the antenna pattern 240 may at least partially overlap a black matrix (BM) region (or bezel region) that is not drive. In this region of the display 110, content is not displayed.

In an embodiment, the antenna pattern 240 may be located between the printed circuit board 210 and the first slit 231 (or the rear plate 120). In another embodiment, unlike the illustration of FIG. 2B, the antenna pattern 240 may be located between the printed circuit board 210 and the display 110.

Figure 3:
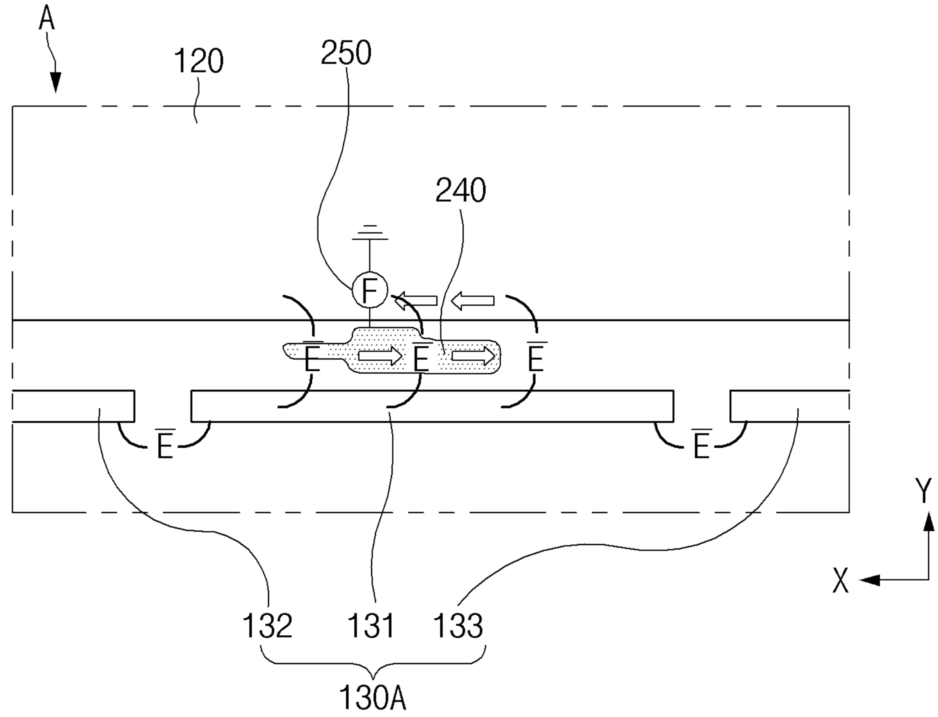
FIG. 3 is a view illustrating an electric field around an antenna pattern of FIG. 2A.

FIG. 3 is a view illustrating an electric field around an antenna pattern of FIG. 2A.

Referring to FIG. 3, the energy radiated from the antenna pattern 240 may be used as an energy source that excites the first slit 231 between the rear plate 120 and the first portion 131 of the first side member 130A, and thus, a first electric field (e.g., E-field) may be formed. In an embodiment, a second electric field may be excited between the first portion 131 and the second portion 132 of the first side member 130A and/or between the first portion 131 and the third portion 133 of the first side member 130A. The first electric field and the second electric field may have an orthogonal characteristic. Due to the orthogonal characteristic, influences between two radiators (e.g., the antenna pattern 240 and the first portion 131 of the first side member 130A) constituting the antenna may be reduced, thus enabling better frequency design.

Figure 4:
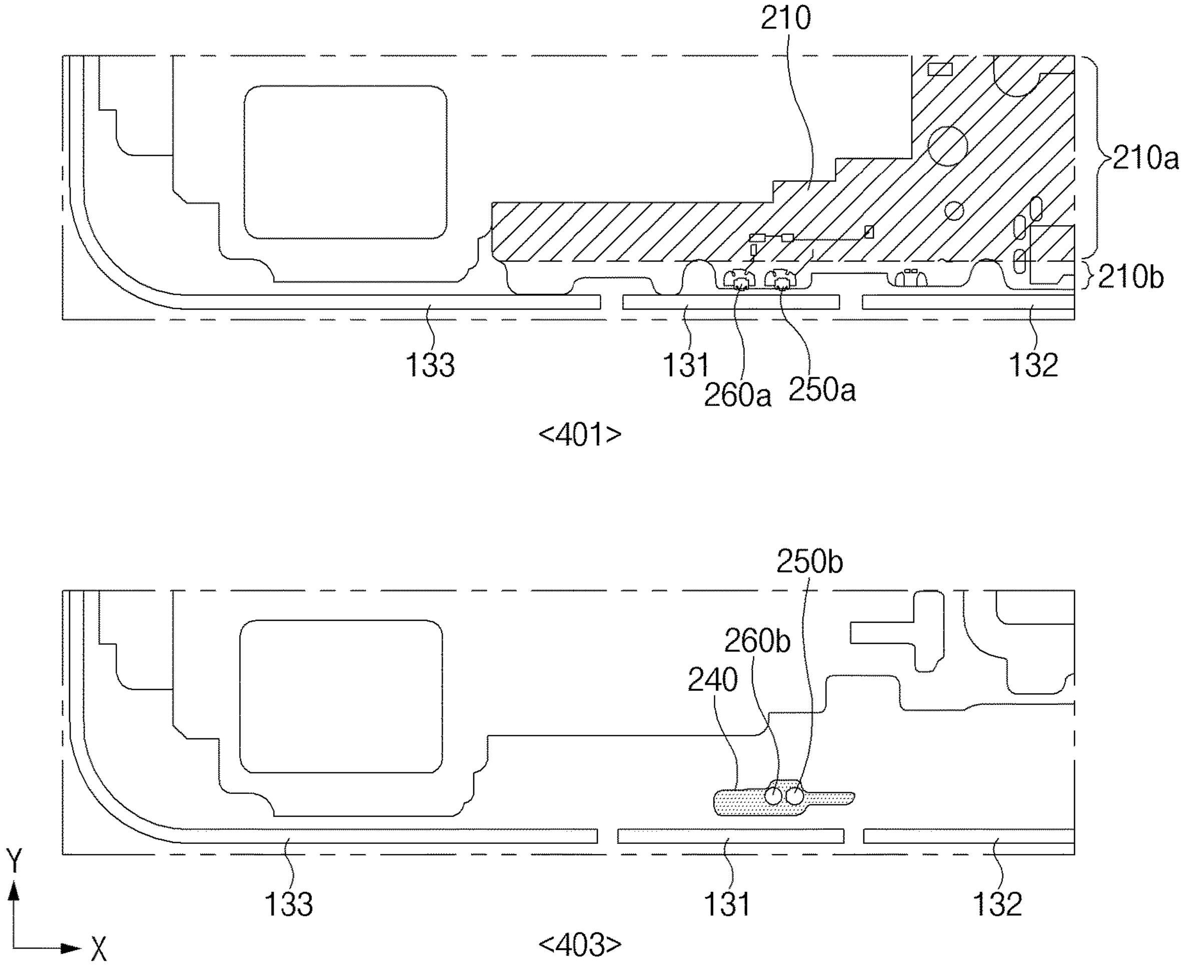
FIG. 4 is a view illustrating an example of a feeding part and a ground part connected with an antenna pattern according to an embodiment.

FIG. 4 is a view illustrating an example of a feeding part and a ground part connected with an antenna pattern according to an embodiment.

Referring to FIG. 4, view 401 may show the front surface of the electronic device 100 after the display 110 is removed from the electronic device 100 of FIG. 1. In view 401, the first region 210*a* of the PCB 210 is indicated by a hatched pattern. View 403 may show the front surface of the electronic device 100 in which the printed circuit board 210 is removed from view 401.

According to an embodiment, in view 401, the printed circuit board 210 may include the first region 210*a* and/or the second region 210*b*. The first region 210*a* may include a ground region (e.g., the ground region 211). A fill-cut process may be performed on the second region 210*b*. The second region 210*b* may not include the conductive layer. As another example, the printed circuit board 210 may not include the second region 210*b*.

According to an embodiment, the printed circuit board 210 may include a first contact pad 250*a* and/or a second contact pad 260*a* in the second region 210*b*. The first contact pad 250*a* and/or the second contact pad 260*a* may be disposed at locations corresponding to the first portion 131 of the first side member 130A. The first contact pad 250*a* and/or the second contact pad 260*a* may be electromagnetically connected with the first portion 131 of the first side member 130A through a connection member (e.g., the first connection member 251 or the second connection member 261). As an example, the first contact pad 250*a* may be connected with a feeding part (e.g., the feeding part 250), and the second contact pad 260*a* may be connected with a ground part (e.g., the ground part 260).

According to an embodiment, in view 403, the antenna pattern 240 may be disposed adjacent to the first portion 131 of the first side member 130A. The antenna pattern 240 may be disposed at a location corresponding to a slit (e.g., the first slit 231) between the first side member 130A and the rear plate (e.g., the rear plate 120). For example, when viewed from above the rear plate, the antenna pattern 240 may at least partially overlap the slit (e.g., the first slit 231 of FIG. 2A). The antenna pattern 240 may include a third contact pad 250*b* and a fourth contact pad 260*b*. For example, the third contact pad 250*b* may be electromagnetically connected with the feeding part (e.g., the feeding part 250) by using a connection member (e.g., the third connection member 252), and the fourth contact pad 260*b* may be electromagnetically connected with the ground part (e.g., the ground part 260) by using a connection member (e.g., the fourth connection member (not illustrated)). According to an embodiment, an electronic device (e.g., the electronic device 100 or 801) may include a display (e.g., the display 110), a rear plate (e.g., the rear plate 120) including a conductive material, a side member (e.g., the side member 130) including a conductive material and disposed to surround a space between the display and the rear plate, a printed circuit board (e.g., the printed circuit board 210) disposed between the display and the rear plate, an antenna pattern (e.g., the antenna pattern 240) at least partially disposed between the printed circuit board and the rear plate and disposed at a position corresponding to a slit (e.g., the first slit 231) between the rear plate and the side member, and a communication module (e.g., the communication module 890) generating a communication signal transferred to the feeding part (e.g., the feeding part 250). A portion of the antenna pattern may be electrically connected with the feeding part. Another portion of the antenna pattern may be electrically connected with a ground region (e.g., the ground region 211) of the printed circuit board. The feeding part may be connected with a portion (e.g., the first portion 131) of the side member.

According to an embodiment, the antenna pattern may be included in a flexible printed circuit board.

According to an embodiment, a length of the antenna pattern in one direction may be configured to be smaller than or equal to a thickness of the slit.

According to an embodiment, the side member may be divided into a plurality of portions, and a length of the antenna pattern in a direction parallel to the slit may be configured to be smaller than a length of at least one of the plurality of portions.

According to an embodiment, the side member may be divided into a plurality of portions including a first portion (e.g., the first portion 131). The first portion may be connected with the feeding part and the ground region to support communication for a first frequency band. The antenna pattern may be connected with the feeding part and the ground region to support communication for a second frequency band.

According to an embodiment, the first frequency band may be lower than the second frequency band.

According to an embodiment, the first portion may support communication for a legacy band. The antenna pattern may support communication for a new radio (NR) band.

According to an embodiment, a portion of the first portion may be electrically connected with the feeding part through a first connection member (e.g., the first connection member 251). Another portion of the first portion may be electrically connected with a ground part (e.g., the ground part 260) connected with the ground region through a second connection member (e.g., the second connection member 261). A portion of the antenna pattern may be electrically connected with the feeding part through a third connection member (e.g., the third connection member 252). Another portion of the antenna pattern may be electrically connected with the ground part through a fourth connection member.

According to an embodiment, the printed circuit board may include a first region including the ground region and a second region in which the ground region is absent. The antenna pattern may be disposed in the second region.

According to an embodiment, the ground region may be electrically connected with the rear plate.

According to an embodiment, an electronic device includes a display, a rear plate including a conductive material, a side member including a plurality of portions including a conductive material and disposed to surround a space between the display and the rear plate, a printed circuit board disposed between the display and the rear plate, an antenna pattern at least partially disposed between the printed circuit board and the rear plate and disposed at a location corresponding to a slit between the rear plate and the side member, and a communication module generating a communication signal transferred to a feeding part. A portion of the side member may be connected with the feeding part to support communication for a first frequency band. The antenna pattern may be connected with the feeding part to support communication for a second frequency band.

According to an embodiment, the first frequency band may be lower than the second frequency band.

According to an embodiment, the portion of the side member may support communication for a legacy band. The antenna pattern may support communication for a new radio (NR) band.

According to an embodiment, the antenna pattern may be included in a flexible printed circuit board.

According to an embodiment, a length of the antenna pattern in one direction may be configured to be smaller than or equal to a thickness of the slit.

According to an embodiment, a length of the antenna pattern in a direction parallel to the slit may be configured to be smaller than a length of the one portion of the side member.

According to an embodiment, the printed circuit board may include a first region including the ground region and a second region in which the ground region is absent. The antenna pattern may be disposed in the second region.

Figure 5:
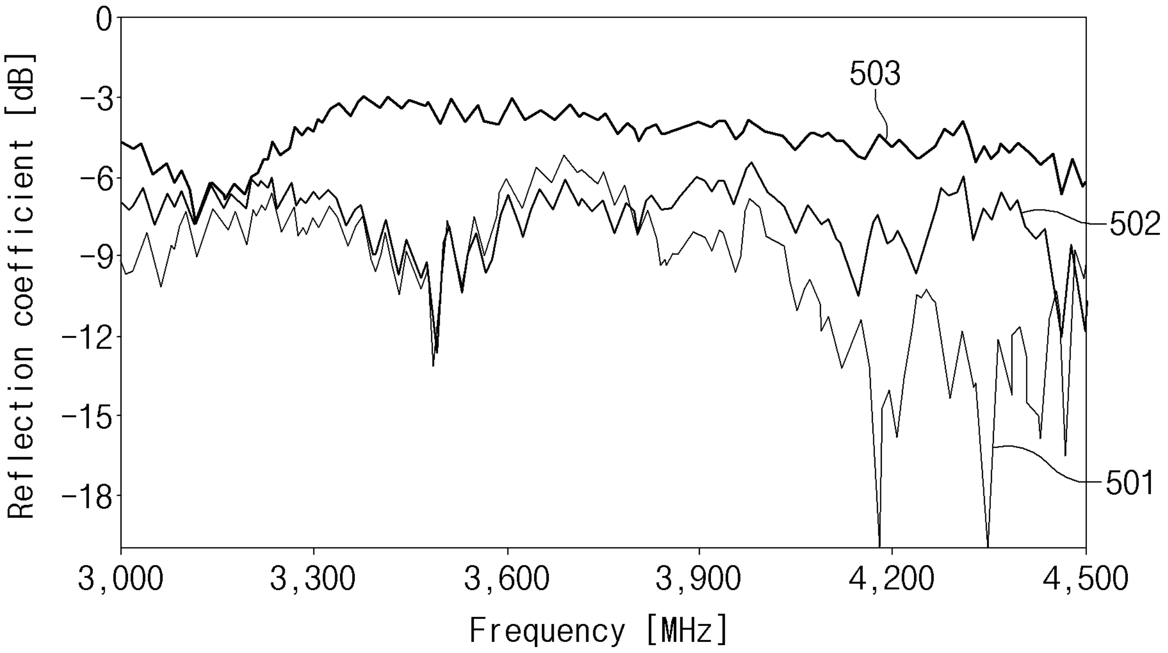
FIG. 5 is a diagram illustrating antenna performance corresponding to an antenna pattern of FIG. 2A.

FIG. 5 is a diagram illustrating antenna performance corresponding to an antenna pattern of FIG. 2A.

Referring to FIG. 5, a first graph 501, a second graph 502, and a third graph 503 may show performance of an antenna including only the antenna pattern 240 of FIG. 2A in various situations. For example, the first graph 501 shows the performance of the antenna when all slits (e.g., the first slit 231, the second slit 232, or the third slit 233) of FIG. 2A are implemented. In the first graph 501, the antenna may show target performance at a specified frequency (e.g., the frequency band ranging from about 4.1 GHz to about 4.5 GHz). The second graph 502 shows the performance of the antenna when the second slit 232 and the third slit 233 in the slits of FIG. 2A are not implemented (e.g. the first portion 131, the second portion 132, and the third portion 133 of the first side member 130A of FIG. 2A are all electrically connected). It may be confirmed from the second graph 502 that performance of the antenna is reduced at the specified frequency compared to the first graph 501. The third graph 503 shows the performance of the antenna when the first slit 231 in the slits of FIG. 2A is not implemented (e.g. the rear plate 120 and the first side member 130A of FIG. 2A are electrically connected). It may be confirmed from the third graph 503 that performance of the antenna is reduced at the specified frequency compared to the second graph 502. Accordingly, the antenna including only the antenna pattern 240 of FIG. 2A may have improved performance targeted for a specified frequency by disposing the antenna pattern 240 in the first slit 231 between the rear plate 120 and the first side member 130A of FIG. 2A and forming the second slit 232 and the third slit 233 in the first side member 130A.

Figure 6A:
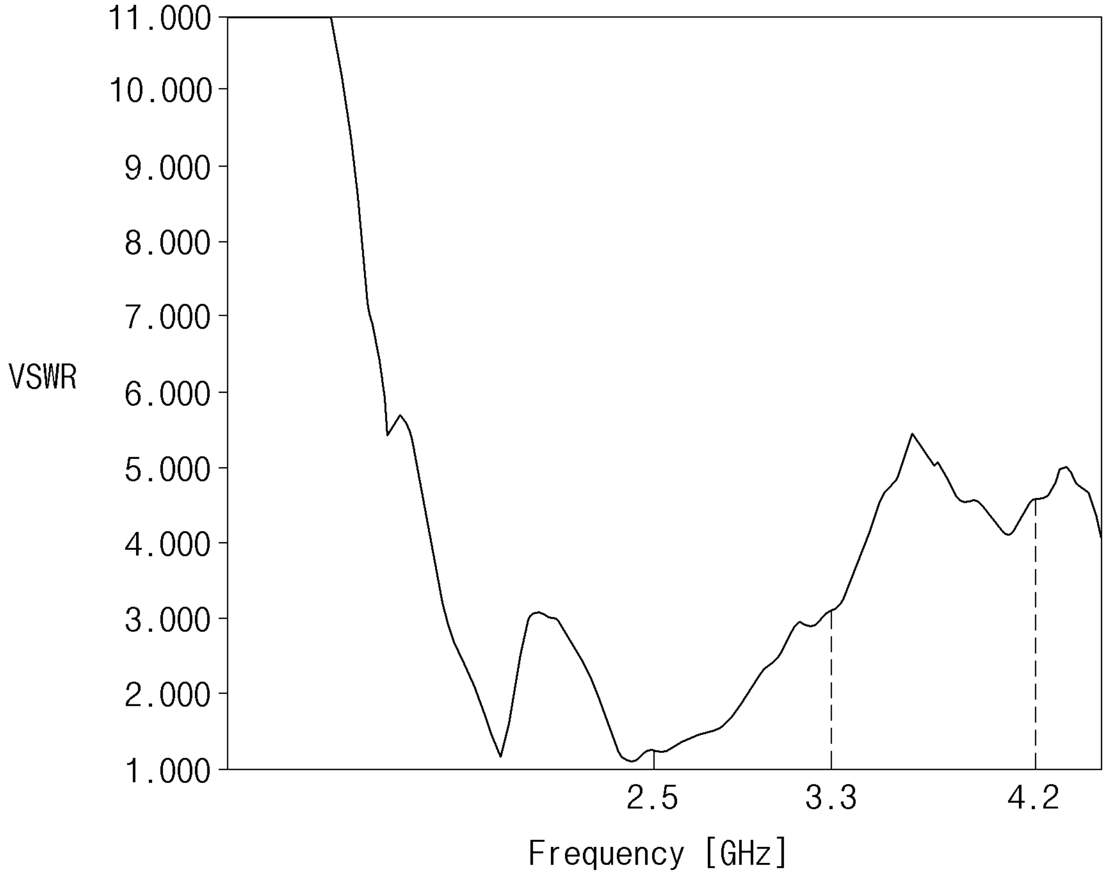
FIG. 6A is a diagram illustrating performance of an antenna including at least a portion of a side member according to an embodiment.
Figure 6B:
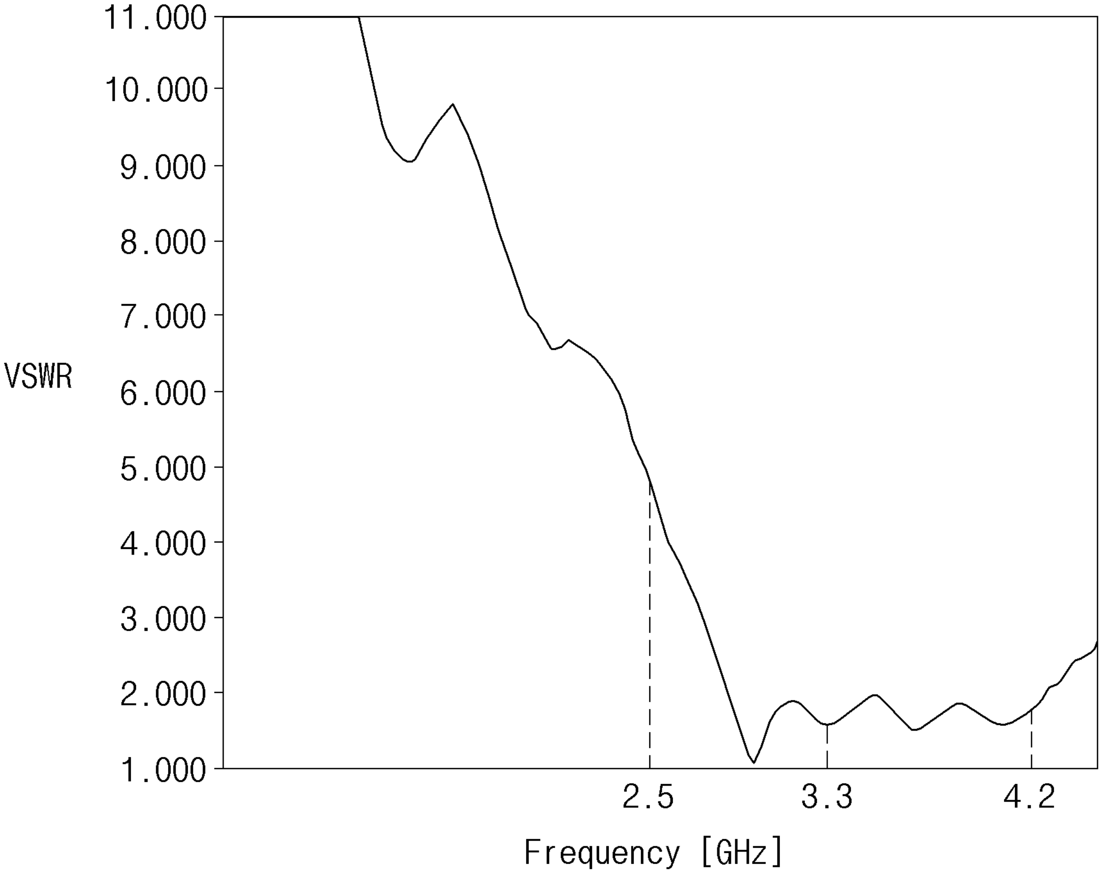
FIG. 6B is a graph illustrating performance of an antenna including the antenna pattern of FIG. 2A, according to an embodiment.
Figure 6C:
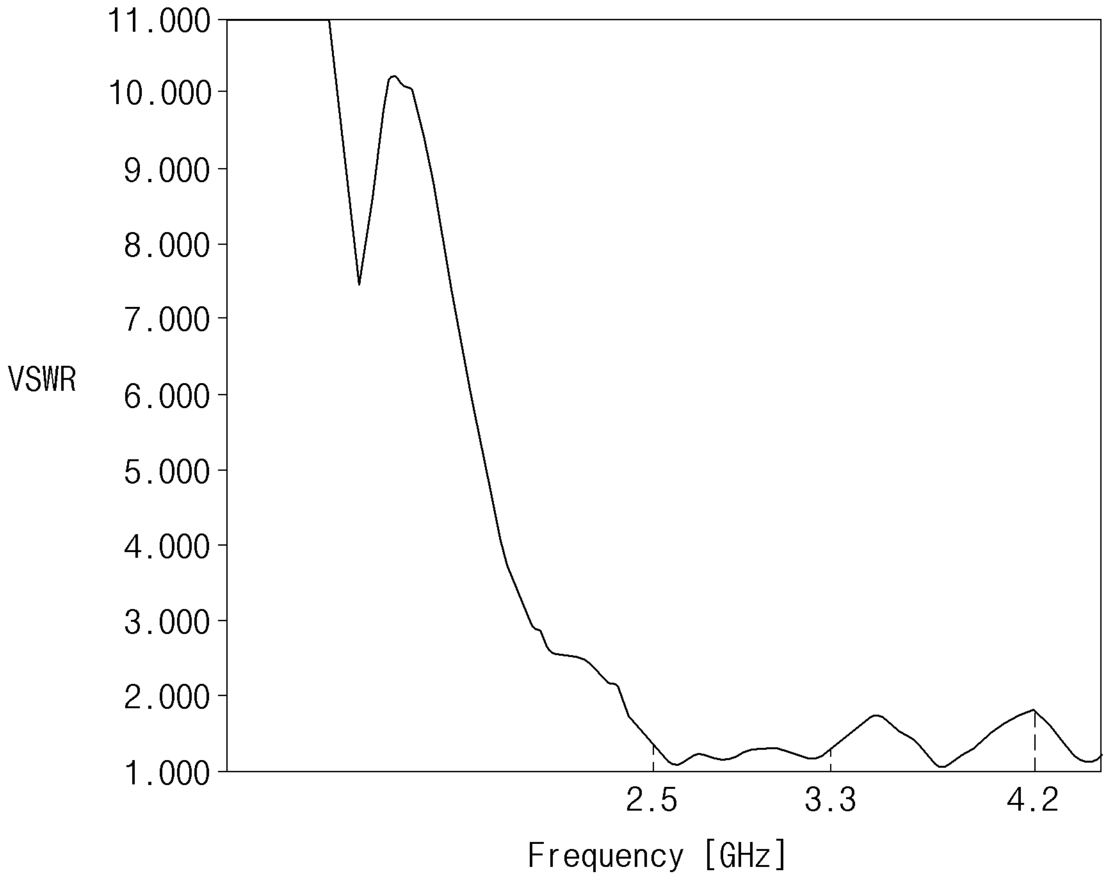
FIG. 6C is a diagram illustrating performance of an antenna including at least a portion of a side member and the antenna pattern of FIG. 2A, according to an embodiment.

FIG. 6A is a diagram illustrating performance of an antenna including at least a portion of a side member (e.g., the first portion 131 of the first side member 130A of FIG. 2A) according to an embodiment. FIG. 6B is a graph illustrating performance of an antenna including the antenna pattern of FIG. 2A, according to an embodiment. FIG. 6C is a diagram illustrating performance of an antenna including at least a portion of a side member and the antenna pattern of FIG. 2A, according to an embodiment.

According to an embodiment, FIG. 6A indicates a voltage standing wave ratio (VSWR) graph when a first antenna including the first portion 131 of the first side member 130A of FIG. 2A is solely used. In FIG. 6A, the first antenna may operate in a first frequency band (e.g., frequency band including about 2.5 GHz, which is a legacy band).

According to an embodiment, FIG. 6B indicates a VSWR graph when a second antenna including the antenna pattern 240 of FIG. 2A is solely used. In FIG. 6B, the second antenna may operate in a second frequency band (e.g., new radio (NR) band ranging from 3.3 GHz to 4.32 GHz).

According to an embodiment, FIG. 6C indicates a VSWR graph when a third antenna including the first portion 131 of the first side member 130A and the antenna pattern 240 of FIG. 2A is used. In FIG. 6C, the third antenna may operate in a broadband including the first frequency band and the second frequency band.

Figure 7A:
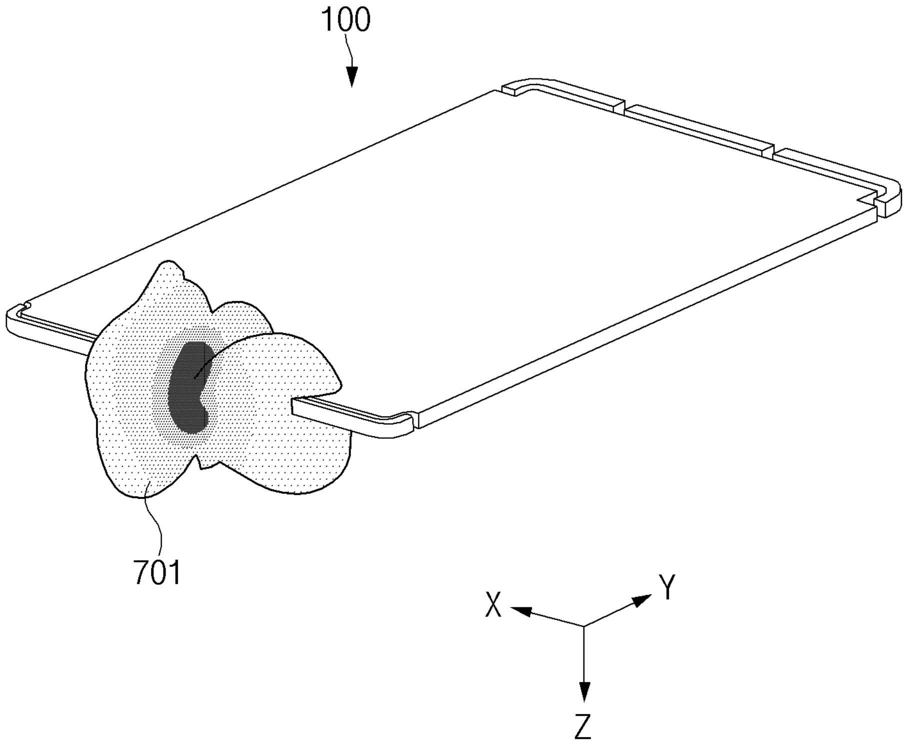
FIG. 7A is a diagram illustrating a radiation pattern of a first antenna including at least a portion of a side member according to an embodiment.
Figure 7B:
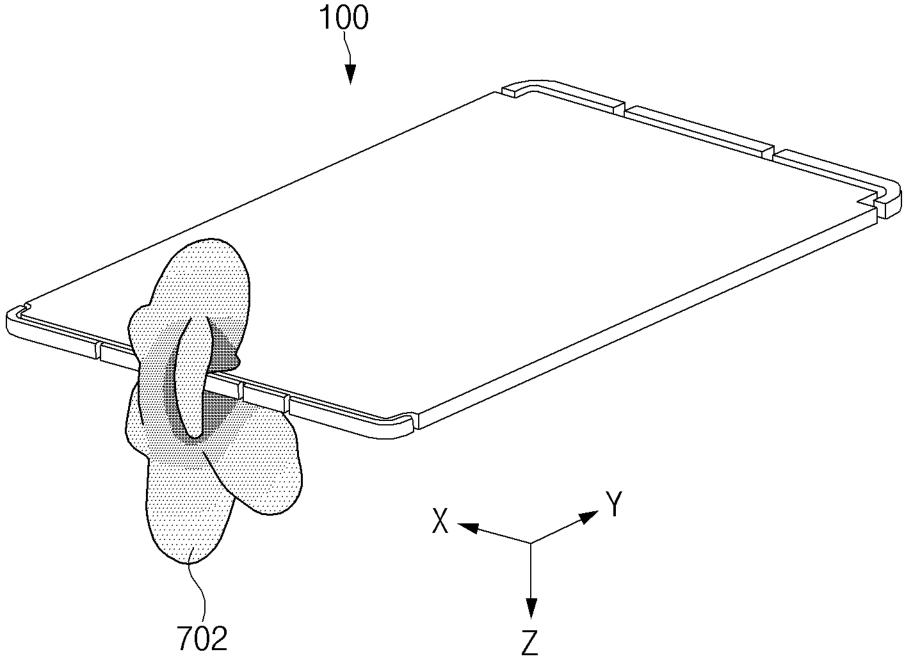
FIG. 7B is a diagram illustrating a radiation pattern of a second antenna including the antenna pattern of FIG. 2A according to an embodiment.
Figure 7C:
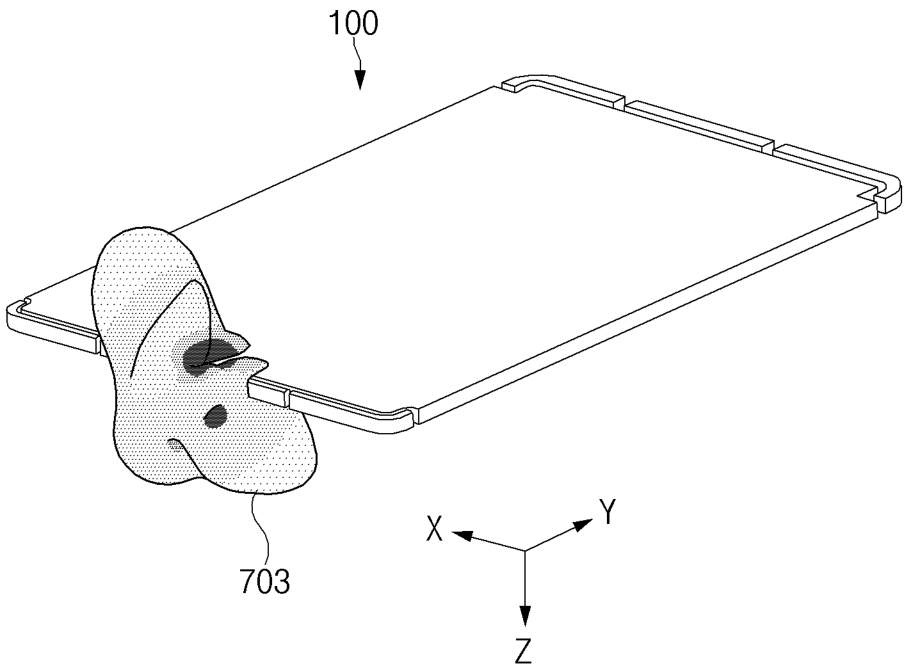
FIG. 7C is a diagram illustrating a radiation pattern of a third antenna including at least a portion of a side member and the antenna pattern of FIG. 2A, according to an embodiment.

FIG. 7A is a diagram illustrating a radiation pattern of a first antenna including at least a portion of a side member (e.g., the first portion 131 of the first side member 130A of FIG. 2A) according to an embodiment. FIG. 7B is a diagram illustrating a radiation pattern of a second antenna including the antenna pattern 240 of FIG. 2A according to an embodiment. FIG. 7C is a diagram illustrating a radiation pattern of a third antenna including at least a portion of a side member (e.g., the first portion 131 of the first side member 130A of FIG. 2A) and the antenna pattern 240 of FIG. 2A according to an embodiment.

According to an embodiment, FIG. 7A shows a radiation pattern of a first antenna including the first portion 131 of the first side member 130A of FIG. 2A when the first antenna is solely used. According to FIG. 7A, the radiation pattern of the first antenna may be formed in the X-axis direction along the first side member 130A.

According to an embodiment, FIG. 7B shows a radiation pattern of a second antenna including the antenna pattern 240 of FIG. 2A when the second antenna is solely used. According to FIG. 7B, the radiation pattern of the second antenna may be formed in the Z-axis direction through the first slit 231 between the rear plate 120 and the first side member 130A of FIG. 3 and a slit or a space between the display 110 and the first side member 130A.

According to an embodiment, FIG. 7C shows the radiation pattern characteristics of the first antenna and the second antenna when a third antenna including the first portion 131 of the first side member 130A and the antenna pattern 240 of FIG. 2A is used. The radiation pattern of the third antenna may be formed widely in the X-axis direction and the Z-axis direction. Accordingly, compared to the case of using only the first antenna or the second antenna, the case of using the third antenna may show more improved radiation performance.

FIG. 8 is a block diagram illustrating an electronic device 801 in a network environment 800 according to an embodiment. Referring to FIG. 8, the electronic device 801 in the network environment 800 may communicate with an electronic device 802 via a first network 898 (e.g., a short-range wireless communication network), or at least one of an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module(SIM) 896, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 864 dB or less) for implementing mMTC, or U-plane latency (e.g., 0.5 ms or less for each of downlink (DL) and uplink (UL), or a round trip of 8 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a display;

a rear plate including a conductive material;

a side member including a conductive portion and disposed to surround a space between the display and the rear plate, the conductive portion of the side member includes a first portion, a second portion, and a third portion;

a printed circuit board disposed between the display and the rear plate and including a ground region;

an antenna pattern at least partially disposed between the printed circuit board and the rear plate and disposed at a location corresponding to a first slit formed as the rear plate and the conductive portion of the side member are at least partially spaced apart from each other, wherein the antenna pattern is electrically connected with the ground region;

a feeding part electrically connected with the antenna pattern and the conductive portion of the side member; and a communication module configured to feed the antenna pattern and the side member through the feeding part and to transmit and/or receive wireless signals, wherein the first portion is located between the second portion and the third portion, wherein the first portion and the second portion are at least partially spaced apart from each other, with a second slit interposed therebetween, wherein the first portion and the third portion are at least partially spaced apart from each other, with a third slit interposed therebetween, wherein the feeding part is electrically connected with the first portion, wherein the first portion is electrically connected with the feeding part through a first connection member at a first point and is electrically connected with a ground part connected with the ground region through a second connection member at a second point different from the first point, and wherein the antenna pattern is electrically connected with the feeding part through a third connection member at a third point and is electrically connected with the ground part through a fourth connection member at a fourth point different from the third point.

2. The electronic device of claim 1, wherein, when viewed from above the rear plate, the antenna pattern at least partially overlaps the first slit.

3. The electronic device of claim 1, wherein the first portion is extended in a first direction, and wherein at least a portion of the first slit is extended in the first direction.

4. The electronic device of claim 1, wherein the first connection member, the second connection member, the third connection member, or the fourth connection member includes a C-clip.

5. The electronic device of claim 1, further comprising:

a flexible printed circuit board, wherein the antenna pattern is formed in the flexible printed circuit board.

6. The electronic device of claim 1, wherein the communication module is configured to feed the antenna pattern and the side member and to transmit and/or receive the wireless signals corresponding to a first frequency band and a second frequency band different from the first frequency band.

7. The electronic device of claim 6, wherein the first frequency band is lower than the second frequency band, wherein the conductive portion of the side member is configured to implement a first resonant frequency corresponding to the first frequency band, and wherein the antenna pattern is configured to implement a second resonant frequency corresponding to the second frequency band.

8. The electronic device of claim 1, wherein the display includes a black matrix (BM) region in which content is not displayed, and wherein, when viewed from above the rear plate, the antenna pattern at least partially overlaps the BM region.

9. The electronic device of claim 1, wherein the printed circuit board includes a first region including the ground region and a second region in which the ground region is absent, and wherein, when viewed from above the rear plate, the antenna pattern at least partially overlaps the second region.

10. The electronic device of claim 9, wherein the first region of the printed circuit board at least partially overlaps the rear plate, and wherein the second region of the printed circuit board at least partially overlaps the first slit.

11. The electronic device of claim 1, wherein the ground region is electrically connected with the rear plate.

12. The electronic device of claim 1, wherein a length of the antenna pattern in one direction is configured to be smaller than or equal to a thickness of the first slit.

13. The electronic device of claim 1, wherein the side member is divided into a plurality of portions, and wherein a length of the antenna pattern in a direction parallel to the first slit is configured to be smaller than a length of at least one of the plurality of portions.

* * * * *